US006446237B1

(12) United States Patent
Menon

(10) Patent No.: US 6,446,237 B1
(45) Date of Patent: Sep. 3, 2002

(54) UPDATING AND READING DATA AND PARITY BLOCKS IN A SHARED DISK SYSTEM

(75) Inventor: Jaishankar Moothedath Menon, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/129,067

(22) Filed: Aug. 4, 1998

(51) Int. Cl.[7] .................. G06F 11/00; G11C 29/00; H02H 3/05
(52) U.S. Cl. ................. 714/800; 714/763; 714/6
(58) Field of Search .................. 714/800, 801, 714/804, 6, 7, 5, 8, 9, 10, 13, 43, 52, 769, 770, 771, 758, 763, 766, 767; 711/112, 113, 114, 119, 122; 707/205

(56) References Cited

U.S. PATENT DOCUMENTS

| 4,654,819 A | 3/1987 | Stiffler et al. ............... 364/900 |
| 4,733,352 A | 3/1988 | Nakamura et al. |
| 4,907,232 A | 3/1990 | Harper et al. ............... 714/797 |

(List continued on next page.)

OTHER PUBLICATIONS

Chen, P. et al., "RAID: High—Performance, Reliable Secondary Storage", *ACM Computing Surveys*, vol. 26, No. 2, pp. 145–185 (Jun. 1994).
IBM Brochure, "SSA RAID Adapter for PC Servers", pp. 1–2, © International Business Machines Corporation 1996.
IBM Manual, "IBM ServeRAID Adapter—84H7117 Installation Instructions and User's Guide", 77 pages, First Edition (Jan. 1997).
IBM Brochure, "3527 SSA Storage Subsystem for PC Servers", pp. 1–2, © International Business Machines Corporation 1997.
IBM Brochure, "IBM PC ServerRAID Adds Two New Features", *IBM Personal computing solutions*, 12 pages (Dec. 16, 1997).
IBM Brochure, "IBM PC Server 704", *IBM Product Summaries, Personal Computing in Canada*, pp. 1–6, Last Published Jan. 16, 1998.
IBM Brochure, "SSA RAID Adapter for PCI", *IBM Storage*, pp. 1–5 (Jan. 16, 1998).
IBM Brochure, Serial Storage Architecture (SSA), *IBM Storage*, pp. 1–2 (Jan. 16, 1998).
IBM Spec Sheet, "PC Server Serial Storage Architecture (SSA) RAID Adapter Spec Sheet", *IBM Personal Computing, Canada*, p. 1, Last Published Nov. 1, 1998.

(List continued on next page.)

*Primary Examiner*—Christine T. Tu
(74) *Attorney, Agent, or Firm*—Altera Law Group, LLC

(57) ABSTRACT

Disclosed is a system for updating data at a data block. A first processing unit, such as an adaptor, receives update data. The data block to update is located in a first storage device, such as a hard disk drive, and a second storage device stores parity data for the data block. A parity group comprises a data block and corresponding parity data for the data block. The first processing unit obtains the data at the data block and calculates partial parity data from the data at the data block and the update data. The first processing unit stores the partial parity data in a storage area and writes the update data to the data block in the first storage device. The first processing unit further updates parity data for parity groups for which partial parity data is maintained by obtaining control of access to the parity group to update from a second processing unit, such as another adaptor, if the first processing unit does not control access to the parity group. When the first processing unit controls access to the parity group, the first processing unit calculates new parity data from the partial parity data and the parity data in the second storage device, and writes the new parity data to the second storage device.

27 Claims, 10 Drawing Sheets

U.S. PATENT DOCUMENTS

| | | | |
|---|---|---|---|
| 4,916,605 A | | 4/1990 | Beardsley et al. |
| 5,140,592 A | | 8/1992 | Idleman et al. ............... 371/8.1 |
| 5,155,729 A | | 10/1992 | Rysko et al. .................. 371/9.1 |
| 5,208,813 A | * | 5/1993 | Stallmo .......................... 714/7 |
| 5,293,618 A | | 3/1994 | Tandai et al. |
| 5,301,297 A | | 4/1994 | Menon et al. ............... 711/114 |
| 5,373,512 A | * | 12/1994 | Brady ........................ 714/767 |
| 5,375,128 A | | 12/1994 | Menon et al. |
| 5,437,022 A | | 7/1995 | Beardsley et al. |
| 5,490,248 A | | 2/1996 | Dan et al. |
| 5,499,337 A | * | 3/1996 | Gordon .......................... 714/6 |
| 5,526,482 A | | 6/1996 | Stallmo et al. ................. 714/6 |
| 5,530,830 A | | 6/1996 | Iwasaki et al. ............. 711/114 |
| 5,530,948 A | * | 6/1996 | Islam ............................. 714/6 |
| 5,546,535 A | | 8/1996 | Stallmo et al. ................. 714/9 |
| 5,572,660 A | | 11/1996 | Jones ............................ 714/6 |
| 5,574,863 A | | 11/1996 | Nelson et al. ......... 395/200.08 |
| 5,574,882 A | | 11/1996 | Menon et al. ............... 711/114 |
| 5,636,359 A | | 6/1997 | Beardsley et al. .......... 711/122 |
| 5,640,530 A | | 6/1997 | Beardsley et al. |
| 5,664,187 A | | 9/1997 | Burkes et al. ............... 707/205 |
| 5,737,514 A | | 4/1998 | Stiffler ........................ 714/13 |
| 5,751,939 A | | 5/1998 | Stiffler ........................ 714/15 |
| 5,787,460 A | | 7/1998 | Yashiro et al. |
| 5,809,224 A | | 9/1998 | Schultz et al. .................. 714/7 |
| 5,813,016 A | | 9/1998 | Sumimoto |
| 5,848,229 A | | 12/1998 | Morita |
| 5,875,456 A | | 2/1999 | Stallmo et al. ............. 711/114 |
| 5,913,227 A | | 6/1999 | Raz et al. |
| 5,940,856 A | | 8/1999 | Arimillii et al. ............ 711/119 |
| 5,940,864 A | | 8/1999 | Arimillii et al. ............ 711/163 |
| 5,999,930 A | | 12/1999 | Wolff |
| 6,073,218 A | | 6/2000 | DeKoning et al. .......... 711/150 |

OTHER PUBLICATIONS

Hewlett Packard Brochure, "Dynamic RAID Technology From Hewlett–Packard Addresses Issues in Current High Availability", *Hewlett Packard, Enterprise Storage Solutions Division,* pp. 1–6 (Revised Apr. 1997).

Hewlett Packard Brochure, "What are Disk Arrays?", *Information Storage,* pp. 1–11 (Jan. 15, 1998).

Judd, I., et al., "Serial Storage Architecture", *IBM Journal of Research & Development,* vol. 40, No. 6—Nontopical issue, pp. 1–14 (Jan. 16, 1998).

Menon, J. et al., "Algorithms for Software and Low–cost Hardware RAID's", *IEEE,* pp. 411–418 (1995).

Menon, J., "Performance of RAID5 Disk Arrays with Read and Write Caching", *Distributed and Parallel Databases,* vol. 2, pp. 261–293 (1994).

Menon, J. et al., "The Architecture of a Fault–Tolerant Cached RAID Controller", *Computer Science, Research Report,* pp. 1–28 (Jan. 22,1993).

MYLEX Manual "DAC960SX Family User Guide, Ultra—SCSI RAID Controllers DAC960SX and DAC960SXI", Manual Version 1.0, Part No. 771975–D01, *Mylex,* ©Copyright 1997 Mylex Corporation.

Patterson, D. et al., "A Case for Redundant Arrays of Inexpensive Disks (RAID)", *ACM,* pp. 109–116 (1988).

Riegel, J. et al., "Performance of Recovery Time Improvement Algorithms for Software RAIDs", *IEEE,* pp. 56–65 (1996).

Jim Handy, The Cache Memory Book, *Academic Press,* pp. 140–190., Academic Press Inc., 1993.

\* cited by examiner

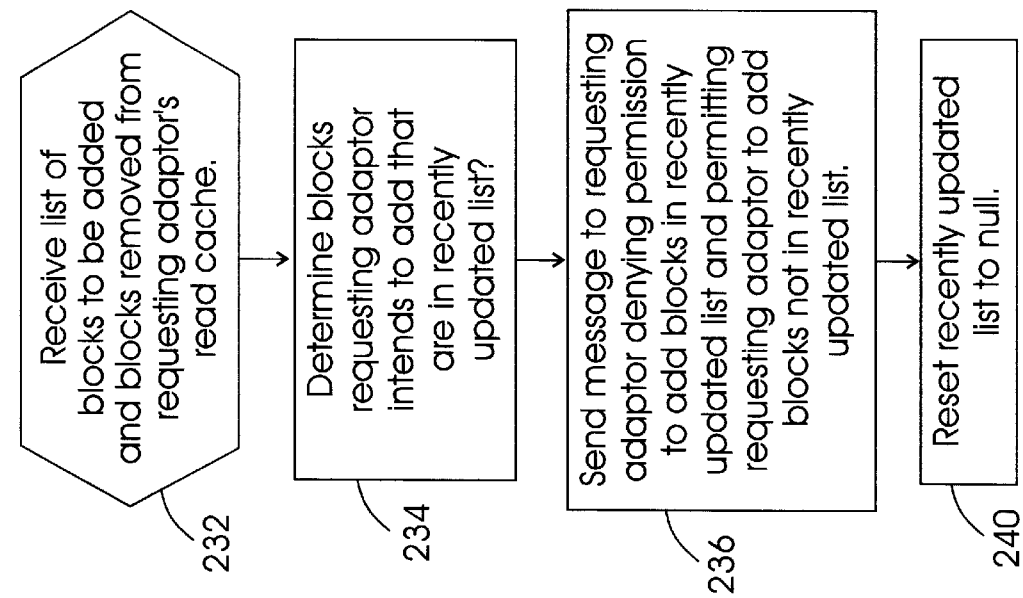

UPDATING AND READING DATA AND PARITY BLOCKS IN A SHARED DISK SYSTEM

CROSS-REFERENCE TO RELATED APPLICATIONS

This application is related to the following co-pending and commonly-assigned patent applications, all of which are filed on the same date herewith, and all which are incorporated herein by reference in their entirety:

"Distributed Storage System Using Front-End And Back-End Locking," by Jai Menon, Divyesh Jadav, Kal Voruganti, Ser. No. 09/129,004;

"System for Updating Data in a Multi-Adaptor Environment," by Jai Menon, Divyesh Jadav, Deepak Kenchammana-Hosekote, Ser. No. 09/128,574;

"System For Changing The Parity Structure Of A Raid Array," by Jai Menon, Divyesh Jadav, Deepak Kenchammana-Hosekote, Ser. No. 09/129,012;

"Updating Data and Parity With and Without Read Caches," by Jai Menon, Ser. No. 09/128,438;

"Updating and Reading Data and Parity Blocks in a Shared Disk System with Request Forwarding," by Jai Menon and Divyesh Jadav, Ser. No. 09/128,754.

BACKGROUND OF THE INVENTION

1. Field of the Invention

The present invention relates to a system for updating data, reading data, and handling storage device and adaptor failures in a shared disk system.

2. Description of the Related Art

In Redundant Arrays of Independent Disks (RAID) systems, data files and related parity are striped across multiple disk drives. In storage subsystems which manage numerous hard disk drives as a single direct access storage device (DASD), the RAID logic is implemented in the controller of the subsystem. RAID storage methodologies have also been implemented in software for execution on a single host computer. This allows the single host computer, such as a personal computer, to implement RAID storage techniques on local hard disk drive space. Such software RAID methodologies are described in "Algorithms for Software and Low Cost Hardware RAIDS," by Jai Menon, Jeff Riegel, and Jim Wyllie, document no. 1063-6390 (IEEE 1995), which is incorporated herein by reference in its entirety.

One problem with the single storage subsystem is the risk of failure. Techniques have been developed to improve failback and recovery in case of failures in the hardware controller. One such failback technique is the Fast Write Technique which provides two separate controllers on different power boundaries that control the flow of data from host systems to DASDs. If one controller fails, the other controller can continue writing data to the DASD. Typically a non-volatile storage unit (NVS) is included with each separate controller, such that each NVS connected to a controller backs up the data the other controller is writing to DASD. Such failback systems employing the two-controller failsafe structure are described in U.S. Pat. Nos. 5,636,359, 5,437,022, 5,640,530, and 4,916,605, all of which are assigned to International Business Machines, Corporation (IBM), the assignee of the subject application, and all of which are incorporated herein by reference in their entirety.

RAID systems can also be implemented in a parallel computing architecture in which there is no central controller. Instead, a plurality of independent controllers that control local hard disk storage devices are separate nodes that function together in parallel to implement RAID storage methodologies across the combined storage space managed by each node. The nodes are connected via a network. Parity calculations can be made at each node, and not centrally. Such parallel RAID architecture is described in "The TickerTAIP Parallel RAID Architecture," by Pei Cao, Swee Boon Lim, Shivakumar Venkatarman, and John Wilkes, published in ACM Transactions on Computer Systems, Vol. 12, No. 3, pgs. 236–269 (August, 1994), which is incorporated herein by reference in its entirety.

One challenge in shared disk systems implementing a parallel, shared disk RAID architecture is to provide a system for insuring that data is properly updated to disks in the system, that a write or update request invalidates stale data so such stale data is not returned, and that a read request returns the most current data.

SUMMARY OF THE INVENTION

To overcome the limitations in the prior art described above, preferred embodiments of the present invention disclose a system for updating data at a data block. A first processing unit receives update data. The data block to update is located in a first storage device and a second storage device stores parity data for the data block. A parity group comprises a data block and corresponding parity data for the data block. The first processing unit obtains the data at the data block and calculates partial parity data from the data at the data block and the update data. The first processing unit stores the partial parity data in a storage area and writes the update data to the data block in the first storage device. The first processing unit further updates parity data for parity groups for which partial parity data is maintained by obtaining control of access to the parity group to update from a second processing unit if the first processing unit does not control access to the parity group. When the first processing unit controls access to the parity group, the first processing unit calculates new parity data from the partial parity data and the parity data in the second storage device, and writes the new parity data to the second storage device.

Further embodiments concern processing a request to read data. A first processing unit receives a request to read a data block in a storage device from a requestor. The first processing unit returns the data from a first cache after determining that the requested data is in the first cache. The first processing unit requests permission from a second processing unit to transfer the data in a second cache to the first cache after determining that the data is in the second cache. The first processing unit transfers the data from the second cache to the first cache and returns the data to the requestor after receiving permission from the second processing unit. After receiving a message from the second processing unit denying permission, the first processing unit reads the data block in the first storage device and returns the read data to the requestor.

Preferred embodiments of message exchanging insure that the first processing unit does not provide data in a read cache that is stale in view of data updates performed by the second processing unit. Moreover, with the preferred embodiments, access to data blocks is controlled. Controlling access helps insure that parity updates are properly handled, data in memory locations is invalidated so that stale or outdated data is not returned to a later read request, stale data is not destaged to a storage device, and a read request returns the latest version of the data block.

BRIEF DESCRIPTION OF THE DRAWINGS

Referring now to the drawings in which like reference numbers represent corresponding parts throughout:

FIGS. 11a, b illustrate flowcharts showing permission exchange logic to grant permission to an adaptor to add data to its read cache in accordance with preferred embodiments of the present invention.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Hardware and Software Environment

Figure 1:
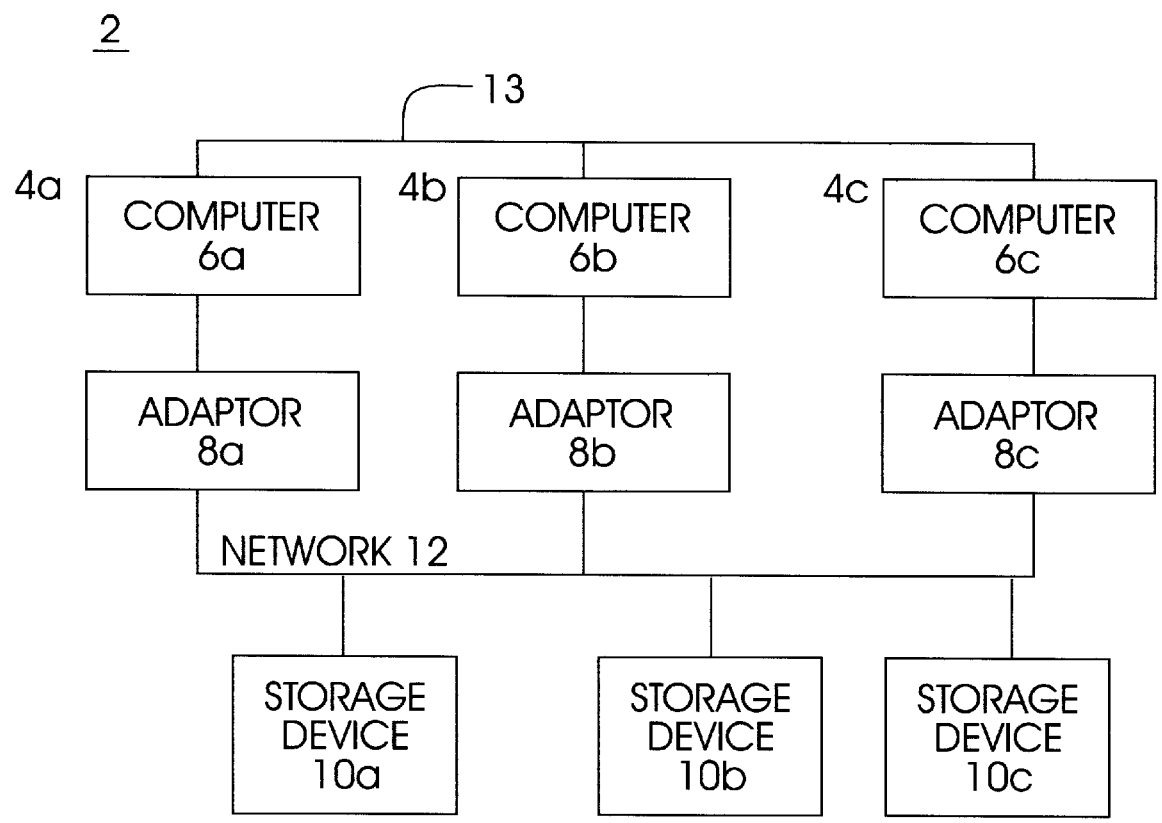
FIG. 1 illustrates a preferred hardware and software environment in which preferred embodiments of the present invention are implemented.

FIG. 1 illustrates a shared device environment comprised of nodes 4a, b, c. Each node includes a computer 6a, b, c, i.e., central processing unit, and an adaptor card 8a, b, c. A plurality of storage devices 10a, b, c interface via a network 12 to the adaptor cards 8a, b, c and attached computers 6a, b, c. The computer 6a, b, c may be a personal computer, workstation, mainframe, etc. The adaptor cards 8a, b, c interface with their respective computers 6a, b, c via a PC bus, such as the PCI bus, and include one or more disk interface ports, such as SCSI or Serial Storage Architecture (SSA) ports. The adaptor cards 8a, b, c include logic to execute the RAID algorithms. The storage devices 10a, b, c may be any suitable non-volatile storage device known in the art, including hard disk drives, magnetic tape, optical disks, non-volatile RAM, holographic units, etc. The nodes 4a, b, c and storage devices 10a, b, c interface via the network 12, which is preferably a high speed interconnect, such as SCSI, SSA, SNA, SAN, FDDI, etc. Additionally, the network 12 may be a SCSI or SSA bus. In further embodiments more nodes than shown may be included in the shared device system 2. Each node may include multiple adaptors, multiple processors and/or local (non-shared) storage devices.

FIG. 1 further illustrates an additional network 13 providing an additional communication line among the computers 6a, b, c. This additional network 13 may be comprised of any suitable network known in the art, e.g., ETHERNET, LAN, etc.

In preferred embodiments, the computers 6a, b, c run parallel processing software, such as the ORACLE PARALLEL SERVER™, the MICROSOFT® Wolfpack Clustering System or any other clustering software. ORACLE PARALLEL SERVER is a trademark of Oracle Corporation; MICROSOFT is a registered trademark of Microsoft Corporation. This parallel processing software allows the computers 6a, b, c to share storage devices 10a, b, c such that any node 4a, b, c may access any block in any of the storage devices 10a, b, c. This parallel architecture allows data to be distributed across different storage devices 10a, b, c throughout the shared device system 2. The parallel processing software, implemented in the computers 6a, b, c, may perform logical locking to insure that only one write request is made to a block in any of the storage devices 10a, b, c, at any given time and to insure that an application does not attempt to read a block being modified by another application. To perform logical locking under control of the parallel processing software, the computers 6a, b, c would exchange messages, data, and information via the additional network 13. The adaptors 8a, b, c perform physical locking.

Figure 2:
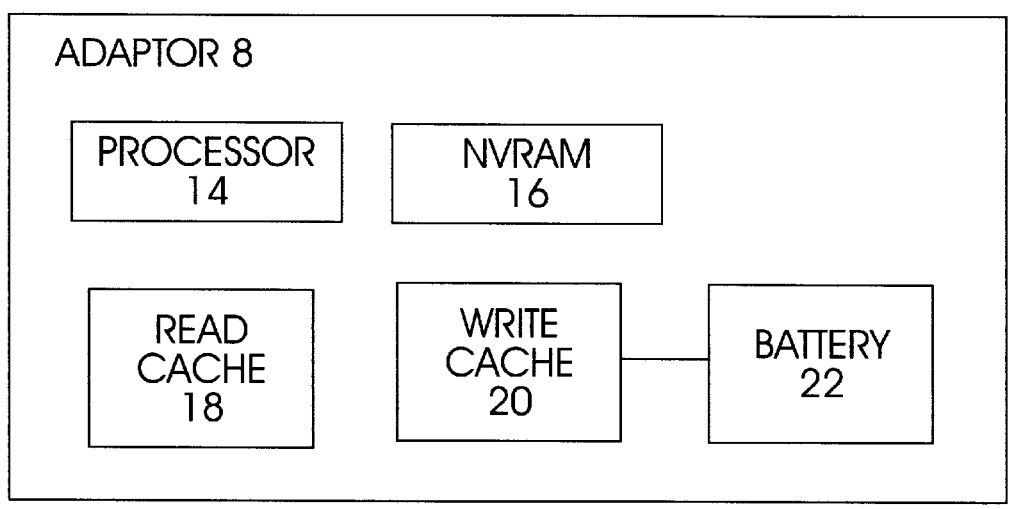
FIG. 2 illustrates a preferred hardware and software architecture of an adaptor in accordance with preferred embodiments of the present invention.

FIG. 2 illustrates a preferred embodiment of the adaptors 8a, b, c. Each adaptor 8a, b, c includes a processor 14a, b, c, a non-volatile RAM 16a, b, c for storing control information, a read cache 18a, b, c, and a write cache 20a, b, c. The read 18a, b, c and write 20a, b, c caches may be comprised of volatile memory, such as RAM, or a non-volatile memory unit, e.g., non-volatile RAM. In certain embodiments, the read cache 18a, b, c and write cache 20a, b, c may be areas within the same memory device or located within separate memory devices. In further embodiments, there may be no read 18a, b, c and/or write 20a, b, c caches. In preferred embodiments, the write caches 20a, b, c contain dirty blocks, which is data intended for a block in the storage device 10a, b, c that is more recent than the block actually maintained in the storage device 10a, b, c. Once the data is written from the write cache 20a, b, c to the storage device 10a, b, c, the copy of the data in the cache is "clean." Because the write cache 20a, b, c only maintains "dirty" blocks, the clean copy in the cache after the update is considered to be in the read cache 18a, b, c, not the write cache 10a, b, c anymore. The components of the adaptors 8a, b, c may be implemented as PC cards such the PC ServeRAID SCSI adaptor from IBM. Alternatively, components and functionality of the adaptors 8a, b, c could be implemented in the computers 6a, b, c.

In certain embodiments, the read cache 18a, b, c may be implemented in a volatile memory device, e.g., DRAM, RAM, etc., and the write cache 20a, b, c may be attached to a battery 22 which makes the write cache 20a, b, c a non-volatile memory device. In such case, an update to a block is initially written in both the RAM (read cache) and the battery 22 backed up write cache 20a, b, c. Once the dirty data is destaged to the storage device 10a, b, c, the copy from the write cache 20a, b, c is marked as invalid for later removal, leaving only the clean copy in the RAM, i.e., read cache. In alternative embodiments, the dirty data may be sent to all other adaptors in the system to invalidate any stale data in their caches. In embodiments with only a single memory device for the read 18a, b, c and write 20a, b, c caches, the data is considered to be in the write cache 20a, b, c prior to destaging and in the read cache 18a, b, c after destaging even though the data remains in the same memory device.

In preferred embodiments, the adaptors 8a, b, c must satisfy all of the following correctness conditions:

(1) a request to write a data block from adaptor 8a simultaneous with a request to write another data block from adaptor 8b, where the two data blocks have the same parity block, causes a correct parity update in the sequence which the updates were made;

(2) a write request through one adaptor 8a for a block in the read 18b or write 20b cache at another adaptor 8b causes the invalidation of data in cache 18b or 20b so that stale data is not returned to a subsequent read request or later destaged to the storage device 10b from old data in caches 18b, 20b; and (3) a read request through one adaptor 8a for a block cached at adaptor 8b in read 18b or write 20b cache, returns the latest version of the data block from adaptor 8b.

Those skilled in the art will recognize that alternative conditions to the three mentioned above may also be satisfied.

Parity in a RAID Environment

Figure 3A:
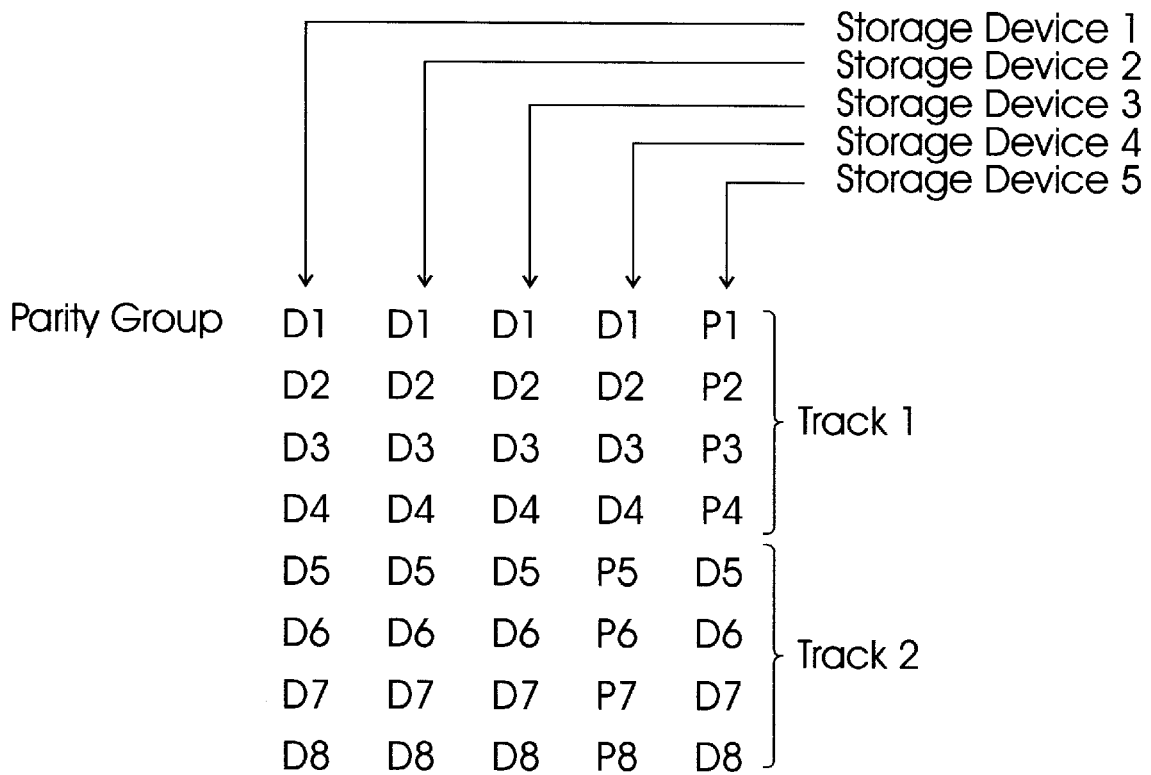
FIGS. 3a, b illustrates embodiments of how data and parity blocks are arranged on storage devices.

FIG. 3a illustrates a 4+P RAID disk array in which a parity block $P_i$ protects four data blocks $D_i$ in four storage devices. Each vertical column represents a storage device. A parity group is a row in the illustration of FIG. 3a that consists of four data blocks $D_i$, one in each storage device, and a parity block $P_i$ maintaining parity information for the four data blocks $D_i$. A parity value $P_i$ is the exclusive OR of the data blocks $D_i$ in the same parity group of a given i. If a disk fails, then the data can be recreated by processing the parity block ($P_i$) and the remaining data blocks $D_i$ for the parity group. FIG. 3a further shows the rotation of parity in that parity blocks $P_5$ through $P_8$ are on a different disk, storage device 4, than the previous parity blocks which are on storage device 5.

In preferred embodiments, a parity block can be updated with the following exclusive OR operation, where the new parity $(P_i')$=(old data $(D_i)$ XOR new data $(D_i')$) XOR old parity $(P_i)$.

Figure 3B:
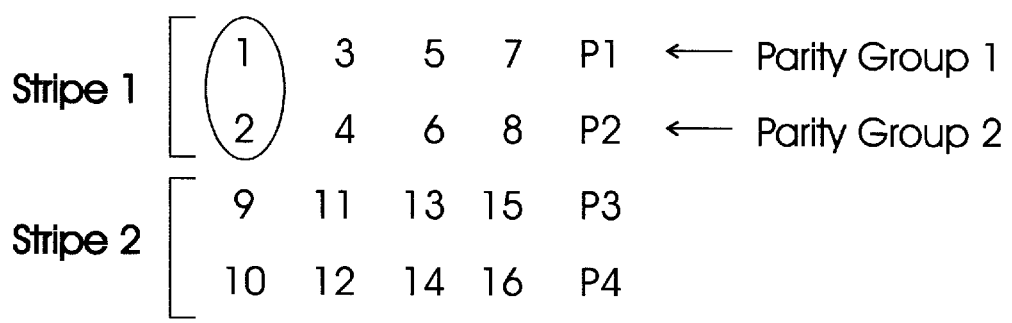

In certain embodiments, data may be stored in "stripe units" on the storage devices. FIG. 3b illustrates a "stripe unit" of data. A stripe unit consists of multiple consecutive blocks of data on a storage device. The "stripe unit" shown in FIG. 3b has two consecutive blocks of data, blocks 1 and 2. A "stripe" consists of multiple stripe units. The "stripe" shown in FIG. 3b has five stripe units. In the exemplar of FIG. 3b, a stripe unit includes blocks from two parity groups throughout each storage device. In alternative embodiments a "stripe unit" and "stripe" could be defined in alternative manners, e.g., including more than two blocks of data, depending on the number of storage devices and parity groups.

In alternative embodiments, other parity schemes may be utilized, such as mirrored RAID, bit-interleaved parity, block-interleaved distributed-parity or P+Q redundancy, etc. These various RAID schemes are discussed in "RAID: High-Performance, Reliable Secondary Storage," by Peter M. Chen, Edward K. Lee, Garth A. Gibson, Randy H. Katz, and David A. Patterson, published in ACM Computing Surveys, Vol. 26, No. 2, pgs. 145–185 (June, 1994), which publication is incorporated herein by reference in its entirety.

Updating Data Blocks in the Same Parity Groups

Figure 4:
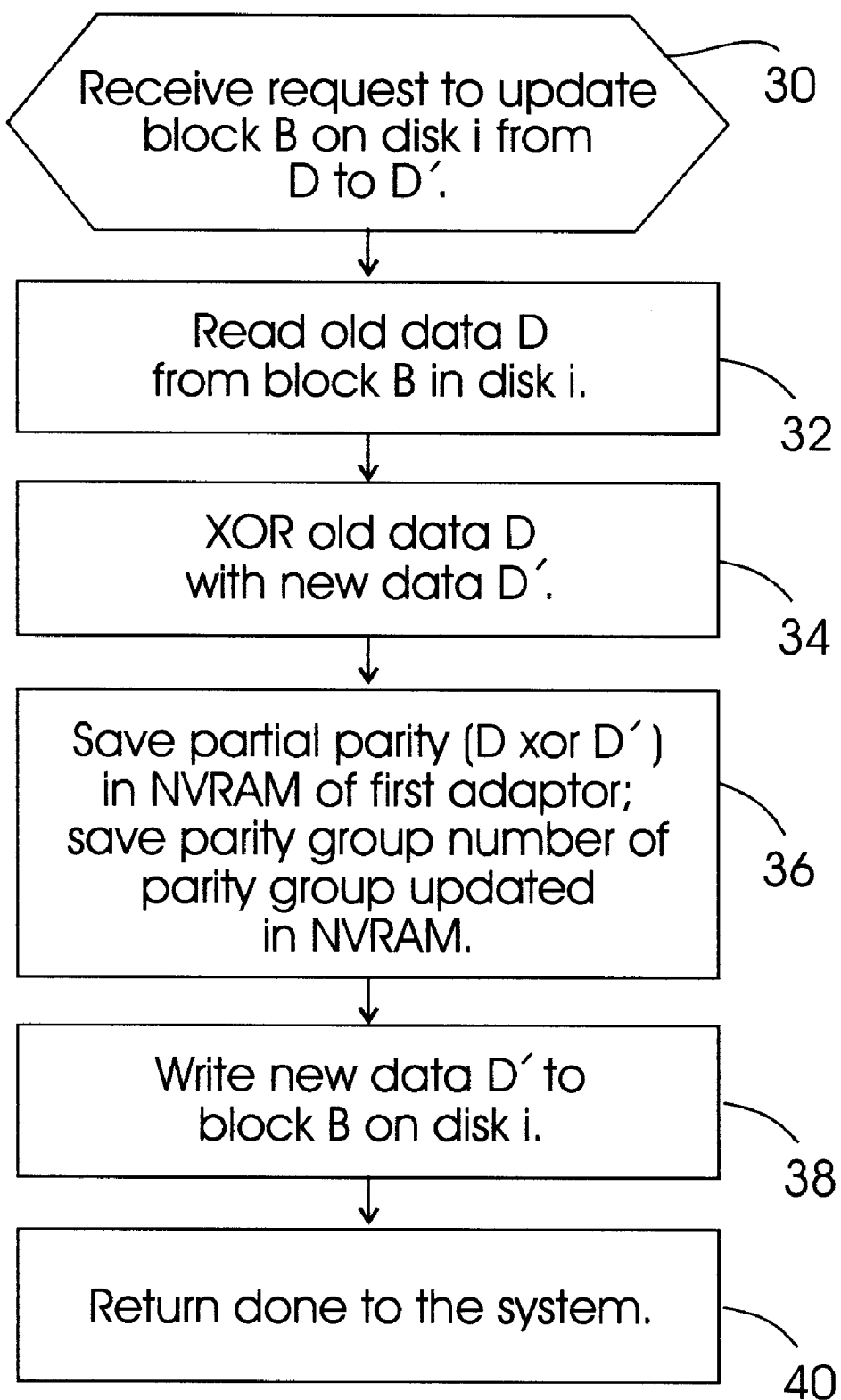
FIG. 4 illustrates a flowchart showing logic to update a data block in accordance with preferred embodiments of the present invention.
Figure 5:
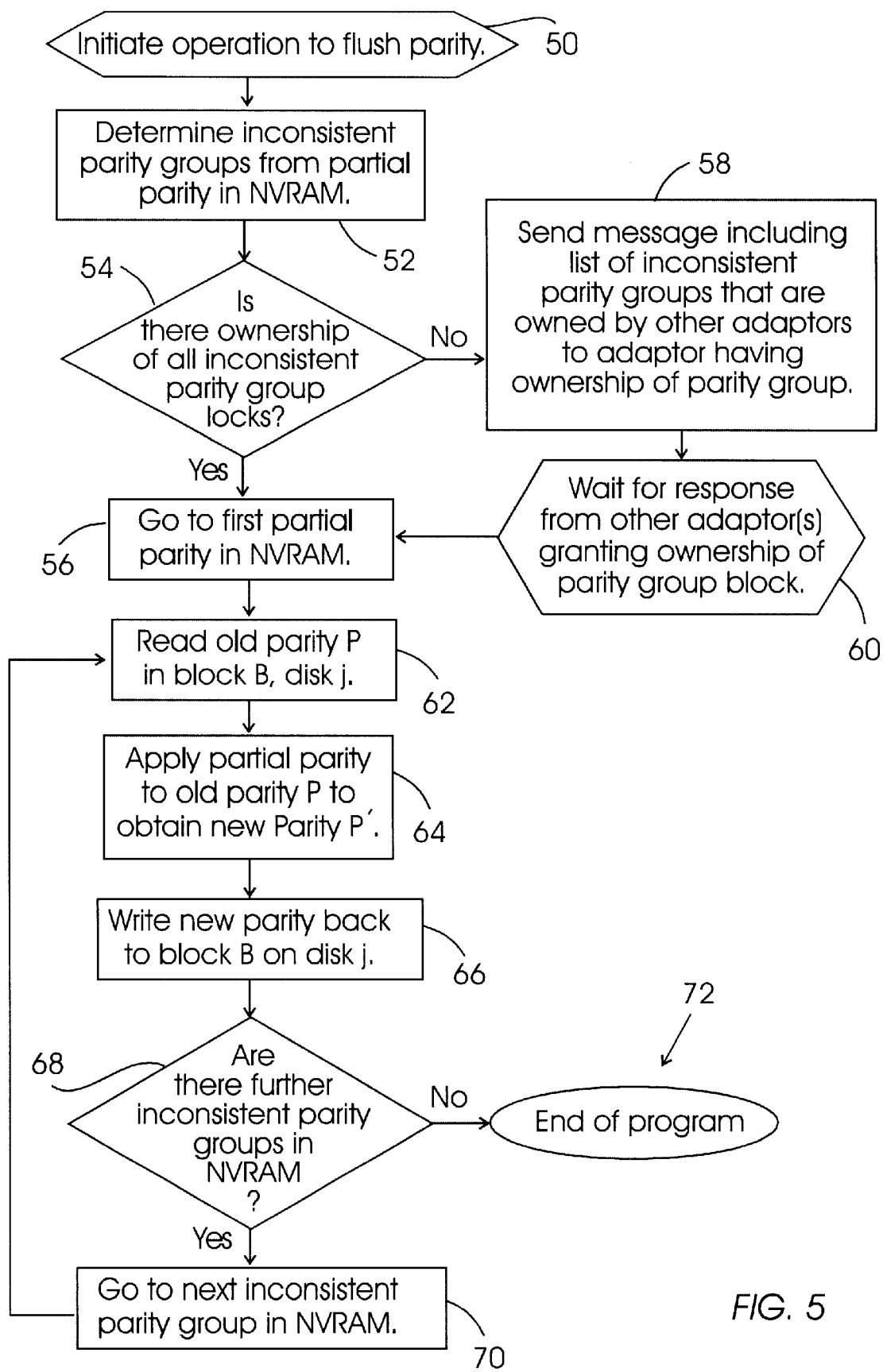
FIG. 5 illustrates a flowchart showing logic to update parity in accordance with preferred embodiments of the present invention.

FIGS. 4 and 5 illustrate logic implemented in the adaptors 8a, b, c, to update parity $P_i$ when simultaneously updating different data blocks $D_i$ in the same parity group. The logic of FIGS. 4 and 5 utilizes the NVRAM 16 to store partial parity data that keeps track of changes that must be made to the parity groups as a result of updating data. With respect to FIG. 4, control begins at block 30 which represents an adaptor, e.g., updating adaptor 8a, receiving a request to update a block of data from D to D' on a disk, e.g., block B in disk i. Disk i may be one of the storage devices 10a, b, c or a storage subunit within one of the storage devices 10a, b, c. Control transfers to block 32 which represents the updating adaptor 8a reading the old data D from block B in disk i via the network 12. Control then transfers to block 34 which represents the updating adaptor 8a calculating partial parity for the data update from the update D' and old data D. In preferred embodiments, partial parity is calculated as D xor D'. However, in alternative embodiments, alternative means known in the art for calculating parity may be used.

After calculating the partial parity, control transfers to block 36 which represents the updating adaptor 10a storing the partial parity in the NVRAM 16a. The updating adaptor 10a would further store information indicating the parity group number to which the partial parity applies. Control then transfers to block 38 which represents the updating adaptor 8a writing the updated data D' to block B on disk i. At block 40, the updating adaptor 8a returns DONE to the system.

In preferred embodiments, the updating adaptor 8a does not immediately update the parity P' after updating the data. The adaptor 8a would perform a parity flushing algorithm to update the parity at a later time, such as when the NVRAM 16a includes a predetermined threshold of partial parities. FIG. 5 illustrates logic implemented in the adaptors 8a, b, c to update parity P' based on partial parity data maintained in the NVRAM 16a. Control begins at block 50 which represents an adaptor, e.g., adaptor 8a, initiating an operation to flush parity from the NVRAM 16a. Control transfers to block 52 which represents the adaptor 8a determining from the partial parity data in the NVRAM 16a the parity group numbers for those parity groups that need to be updated, i.e., inconsistent parity groups. Methods for identifying inconsistent parity groups are known in the art and described in U.S. Pat. No. 5,574,882, entitled "System and Method for Identifying Inconsistent Parity in an Array of Storage," assigned to IBM, which patent is incorporated herein by reference in its entirety.

Control then transfers to block 54 which is a decision block representing the flushing adaptor 8a determining whether it has ownership of the locks of all the inconsistent parity groups. Only adaptors 8a, b, c having the lock for a parity group or data block, or other stored unit, can access such unit. The lock system arbitrates access to stored units to insure that data consistency is maintained for read and write operations. If the flushing adaptor 8a has ownership of locks for all the inconsistent parity groups in its NVRAM 16, then control transfers to block 56; otherwise, control transfers to block 58. Block 58 represents the adaptor 8a sending a message including a list of the inconsistent parity groups for which partial parity data is maintained, for which adaptor 8a does not have lock ownership, to the other adaptor, e.g., 8b. The adaptor 8a may send a message as a single message or as multiple messages. In a two adaptor 8a, b system, the flushing adaptor 8a would request ownership from the second adaptor 8b as there is only one other possible owner of the lock. However, in the N adaptor case, the flushing adaptor 8a, would have to send a message to all other N−1 adaptors in the system to obtain lock ownership.

Control transfers to block 60 which represents the flushing adaptor 8a waiting for a response from the other adaptor(s) granting ownership of the lock for the parity group. After receiving ownership at block 60 or if the adaptor 8a already had ownership at block 54, control transfers to block 56 which represents the flushing adaptor 8a going to the inconsistent parity group in the NVRAM, i.e., first partial parity entry. Control then transfers to block 62 which represents the adaptor 8a reading old parity P from block B in disk j. Control transfers to block 64 which represents the adaptor 8a applying the partial parity (D xor D') to the old parity P read at block 62 and calculating the new parity P'. Control transfers to block 66 which represents the adaptor 8a writing the new parity P' back to block B on disk j to replace the old parity P.

Control then transfers to block 68 which is a decision block representing the flushing adaptor 8a determining whether there are any additional inconsistent parity groups not yet updated maintained in the NVRAM 16a. If so, control transfers to block 70 to proceed to the next inconsistent parity group and partial parity data in the NVRAM 16a, and update the parity for that inconsistent parity group by proceeding to blocks 62 et seq. Otherwise, if there are no further inconsistent parity groups, control transfers to block 72 which represents the completion of the parity flushing operation.

In further embodiments, if an adaptor receives an update of data from D to D' and subsequently receives another update from D' to D", before the adaptor updates the parity, the adaptor can store a combined partial parity of the two updates (D' xor D") instead of separately storing two partial parities D xor D' and D' xor D". In this way, the updating adaptor 8a can save space in its NVRAM 16a by combining partial parities. If, in alternative embodiments, the adaptor 8a stores two or more partial parities in NVRAM 16a, e.g., D xor D' and D' xor D", then the adaptor 8a can apply all partial parities to the parity block before writing the new parity to the parity block. For instance, the adaptor can calculate D xor D' xor D" xor P. In this way, the adaptor 8a can optimize writes to the parity block in the disk j. However, in optimizing writes to the disk, the adaptor does not optimize partial parity storage space in the NVRAM 16 because it does not combine partial parities into a single partial parity entry.

Handling Disk Failure

Figure 6:
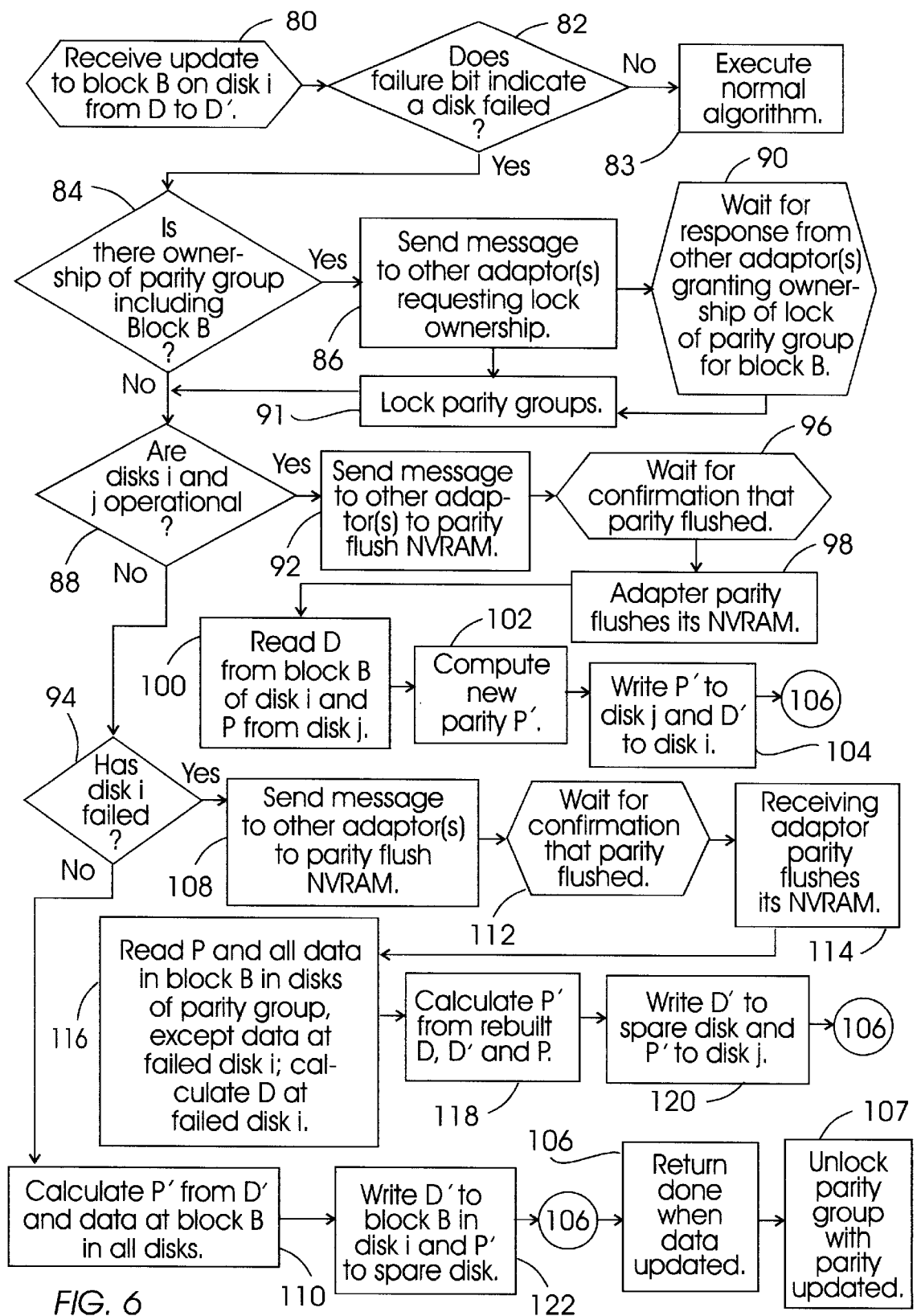
FIG. 6 illustrates a flowchart showing logic to update a data block in the event of a disk failure.

If a disk fails, the adaptors must do parity flushing using partial parity data in their NVRAMs 16a, b, c. To rebuild the data, input/output requests to the shared data would be halted, and an adaptor would rebuild the lost data to a spare disk using a RAID algorithm known in the art. FIG. 6 illustrates preferred logic to update data and parity blocks in the event one of the storage devices 10a, b, c has failed. Read and write activity may be stopped until the parity flushing and rebuild are complete. Alternatively, read and write activity may continue during parity flushing and rebuild operations.

Control begins at block 80 which represents an adaptor, e.g., updating adaptor 8a, receiving an update to block B on disk i from D to D'. As before, parity data P is maintained in disk j at block B. Control transfers to block 82 which represents the updating adaptor 8a determining if a failure bit set in the system 2 indicates that a disk failed. When a disk fails, which may be a storage device 10a, b, c or a component of a storage device 10a, b, c, a failure bit somewhere in the system 2 may be set to indicate such failure. If the adaptor 8a determines that the failure bit indicates that a disk failed, then control transfers to block 84; otherwise, control transfers to block 83 which represents the adaptor 8a executing a an algorithm for the non-failure case, such as the algorithms described with respect to FIGS. 4 and 5. Block 84 is a decision block representing the updating adaptor 8a determining whether adaptor 8a has ownership of the lock for the parity group including block B. If so, control transfers to block 86; otherwise, control transfers to block 88. If the updating adaptor 8a does not have lock ownership, block 86 represents the updating adaptor 8a sending a message to the other adaptor(s) requesting lock ownership. Control transfers to block 90 which represents the updating adaptor 8a waiting for a response from the other adaptor(s) granting ownership. After receiving the grant of lock ownership, control transfers to block 91 which represents the updating adaptor 8a locking the parity groups to prevent other adaptors from performing I/O operations on data blocks within the locked parity groups. If the updating adaptor had ownership at block 84 or after locking the parity groups at block 91, control transfers to block 88 which is a decision block representing the updating adaptor determining whether disks i and j are operational. If so, control transfers to block 92; otherwise control transfers to block 94.

If the disks i and j are operational, then at block 92, the updating adaptor 8a sends a message to the other adaptors(s) to flush their parity from the inconsistent parity groups in their NVRAMs 16a, b, c. Control transfers to block 96 which represents the updating adaptor 8a waiting for confirmation that the other adaptor(s) have flushed parity. After receiving such confirmation, control transfers to block 98 which represents the updating adaptor 8a flushing the inconsistent parity groups from the NVRAM 16a. The adaptor 8a may use the flushing logic described with respect to FIG. 5. Control transfers to block 100 which represents the updating adaptor 8a reading the old data D from disk i and old parity P from disk j. The adaptor 8a then computes the new parity P' at block 102 from (P XOR D XOR D'). Control transfers to block 104 to write the new parity P' to disk j and the new data D' to disk i. Control then transfers to block 106 to return DONE to the system when the new data is updated to disk i. Control transfers to block 107 to unlock the parity groups after both the new data D' and new parity P' are updated at disks i and j. Thus, DONE can be returned to the system before the parity group is unlocked.

If one of disks i and j have failed, then at block 94, the adaptor 8a determines whether disk i failed. If so, control transfers to block 108; otherwise, control transfers to block 110. Blocks 108, 112, and 114 represent the updating adaptor 8a insuring that the other adaptor(s) flush their inconsistent parity before flushing parity from NVRAM 16a. Control transfers to block 116 which represents the updating adaptor 8a reading old parity P and all data at block B in the other disks in the parity group, except for the data in block B of the failed disk i. The updating adaptor 8a then calculates old data D in the failed disk i from all the data read from block B in the other disks in the parity group and the old parity (P) in disk j. Control then transfers to block 118 which represents the updating adaptor 8a calculating the new parity P' from XORing the rebuilt old data D, new data D', and old parity P. Control then transfers to block 120 which represents the updating adaptor 8a starting the process of writing the new data D' to a spare disk, if a spare disk is available, and the new parity P' to disk j. Control then transfers to block 106 to return DONE when the writing of the new data D' is complete and to block 107 to unlock the parity group when the writing of the new parity P' to disk j is complete.

If, at block 94, the updating adaptor 8a determined that disk j failed, i.e., disk i did not fail, then at block 110, the updating adaptor 8*a* calculates the new parity P' from the new data D' and the data at block B in all disks in the parity group, including the old data D in disk i. As discussed, in preferred embodiments, parity is calcualted by XORing the values. Control then transfers to block 122 which represents the updating adaptor 8*a* beginning the process of writing the new data D to block B in disk i and new parity P' to a spare disk. Control then transfers to block 106 et seq.

The logic of FIG. 6 to update a data block can be used in handling read requests to the data block B to which the data must be updated before flushing and rebuilding of the failed disk are complete. If disk i is not failed, then the requested data can be read from block B at disk i. If disk i failed, then the receiving adaptor would perform the logic of blocks 108 through 116 to calculate the data D on the failed disk i, and return the requested data D to the requester.

Handling Adaptor Failure

If an adaptor fails, e.g., adaptor 8*a*, the NVRAM 16*a* of the failed adaptor can be moved to a new adaptor because the NVRAM contains information concerning lock ownership and partial parties. If the NVRAM of the failed adaptor 8*a* cannot be removed or has failed, then parity must be entirely rebuilt. In such case, all the partial parities in NVRAMs would be discarded, and all the adaptors would go into a mode where update requests are handled by updating data to the data disks. In this mode, the adaptors may suspend generating partial parity data. One of the surviving adaptors would execute a rebuild algorithm to rebuild parity from all the data. The surviving adaptor would have to obtain lock ownership before rebuilding the parity data. After the rebuild, adaptors can return to saving partial parity information in NVRAM. The adaptors may return to calculating and saving partial parity data on a parity group by parity group basis.

Figure 7:
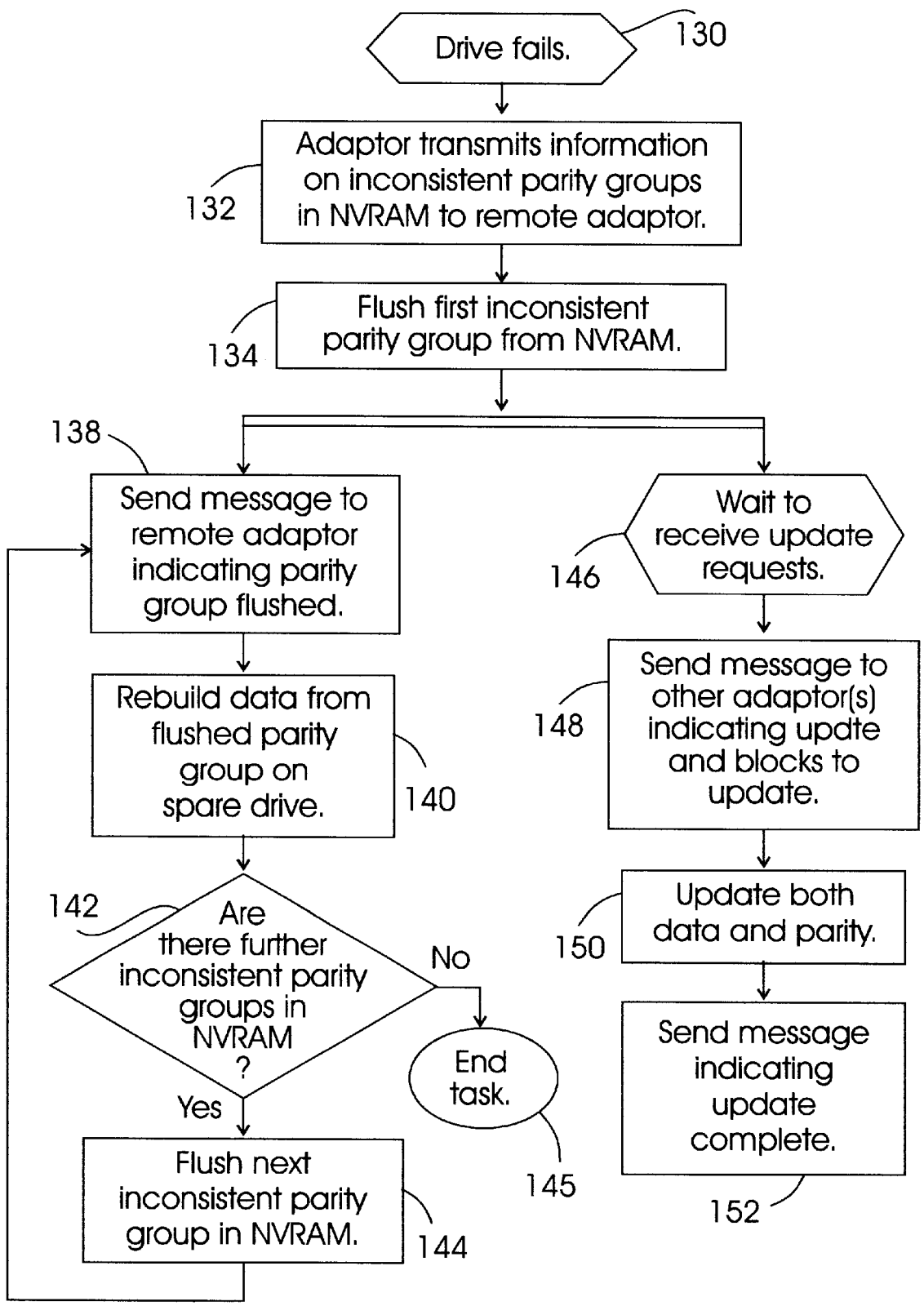
FIG. 7 illustrates a flowchart showing logic to rebuild a failed drive and handle update requests.

As soon as a drive, i.e., storage device, fails, a degraded mode is entered if there are no spare disks or a rebuild mode is entered if there are spare disks onto which to rebuild the data in the failed disk. FIG. 7 illustrates logic implemented in the adaptors 8*a, b, c* that is executed when a drive fails. After a drive fails, the adaptors begin transmitting information on inconsistent parity groups to the other adaptor(s). In this way, each adaptor has a view of the inconsistent parity groups so that in the event that one of the adaptors fails, the information on such inconsistent parity groups maintained by the failed adaptor will not be lost. The surviving adaptor(s) would know which groups are inconsistent and, thus, be able to rebuild the data without the failed adaptor.

Logic begins at block 130 which represents a part or whole of a storage device 10*a, b, c* failing. Control transfers to block 132 which represents an adaptor 8*a, b, c* transmitting information on inconsistent parity groups in the NVRAM 16*a, b, c* to the other adaptors. In this way, the adaptors exchange information on the inconsistent parity groups maintained in their NVRAMs 16*a, b, c*. Control transfers to block 134 which represents an adaptor 8*a, b, c* flushing the first inconsistent parity group from NVRAM 16*a, b, c* in the manner described with respect to blocks 62–66 in FIG. 5. Control then transfers to a parallel mode to simultaneously process tasks beginning at blocks 138 and 146 in a multi-tasking manner.

Block 138 represents an adaptor 8*a, b, c* sending a message to the other adaptors indicating the parity group just flushed or made consistent. This allows the adaptors to have a current view of inconsistent parity groups across all other adaptor(s). Control transfers to block 140 which represents the adaptor 8*a, b, c* rebuilding the data or parity data in the just flushed parity group to a spare disk. Control then transfers to block 142 which represents the adaptor 8*a, b, c* determining whether there are further inconsistent parity groups in the NVRAM 16*a, b, c*. If so, control transfers to block 144 which represents the adaptor 8*a, b, c* flushing the next inconsistent parity group from the NVRAM 16*a, b, c* and proceeding back to blocks 138 et seq. If there are no further inconsistent parity groups, control transfers to block 145 to end the flushing task.

Block 146 represents the adaptors waiting to receive an update to a data block. After receiving such update, control transfers to block 148 which represents the updating adaptor sending a message to the other adaptor(s) indicating the update and the blocks to update. The updating adaptor may also transmit the updated data. Control transfers to block 150 which represents the adaptor updating both data and parity. Control then transfers to block 152 which represents the updating adaptor sending a message to the other adaptor(s) indicating the completion of the update. In this way, if an adaptor fails, the surviving adaptor(s) know which parity groups are inconsistent and the parity group where failure occurred.

In another embodiment, the adaptors 8*a, b, c* may maintain a list of flushed parity groups that recently became consistent. To maintain such a list, additional messages must be generated to inform other adaptors when a parity group is updated and made consistent. Maintaining such a list reduces the workload in case an adaptor fails because the surviving adaptor(s) have a view of parity groups recently flushed and made consistent. This additional embodiment including the list of consistent groups involves a modification of the logic of FIGS. 4 and 5 for updating and flushing parity. The modification involves adding a step prior to block 32 in FIG. 4 to have the updating adaptor send a message to the other adaptor(s) with the parity group being updated and the list of recently flushed parity groups. The updating adaptor would then wait for a response from the other adaptor(s) acknowledging receipt of the message. When parity flushing, the algorithm of FIG. 5 would be modified to add a parity group to the list of recently flushed parity groups after completion of parity flushing of the inconsistent parity group in the NVRAM between blocks 66 and 68.

Update Requests with Read Caches

If the adaptors 8*a, b, c* include read caches 18, then the algorithms should satisfy two correctness conditions: (1) when an update occurs to different blocks having the same parity block, parity is likewise updated and (2) an update request through one adaptor, e.g., adaptor 8*a*, which is cached at another adaptor, e.g., adaptor 8*b*, causes the invalidation of the caches in the other adaptor 8*b* so that the adaptor 8*b* does not return or destage stale data.

Figure 8:
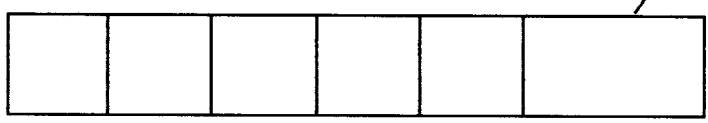
FIG. 8 illustrates a memory area of the adaptor, including data structures in accordance with preferred embodiments of the present invention.
Figure 8:
Figure 8:
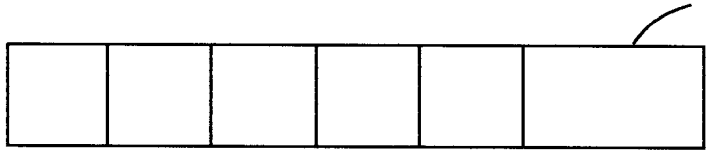

In the embodiments utilizing read caches 18*a, b, c*, the adaptors 8*a, b, c* maintain a data structure indicating data cached at other remote adaptors. Preferred embodiments are described with respect to a two adaptor 8*a, b* system. However, the logic could be extended to an N adaptor case. FIG. 8 illustrates a RAM 154*a, b, c* within each adaptor 8*a, b, c* storing three data structures. The first data structure 155 is a list of data blocks waiting to be added to the read cache 18*a, b, c*. Until the adaptor 8*a, b, c* adds the data blocks to the read cache 18*a, b, c* they are maintained in the adaptors RAM 154*a, b, c*. Data structure 156*a, b, c* is a list of blocks recently updated by the adaptor 8*a, b, c* and data structure 158*a, b, c* is a list of blocks in the other adapter's read cache 18*a, b, c*, i.e., a directory of the other adaptor's read cache. Each adaptor 8*a, b, c* also maintains a list of inconsistency groups in its NVRAM 16*a, b, c*.

Figure 9:
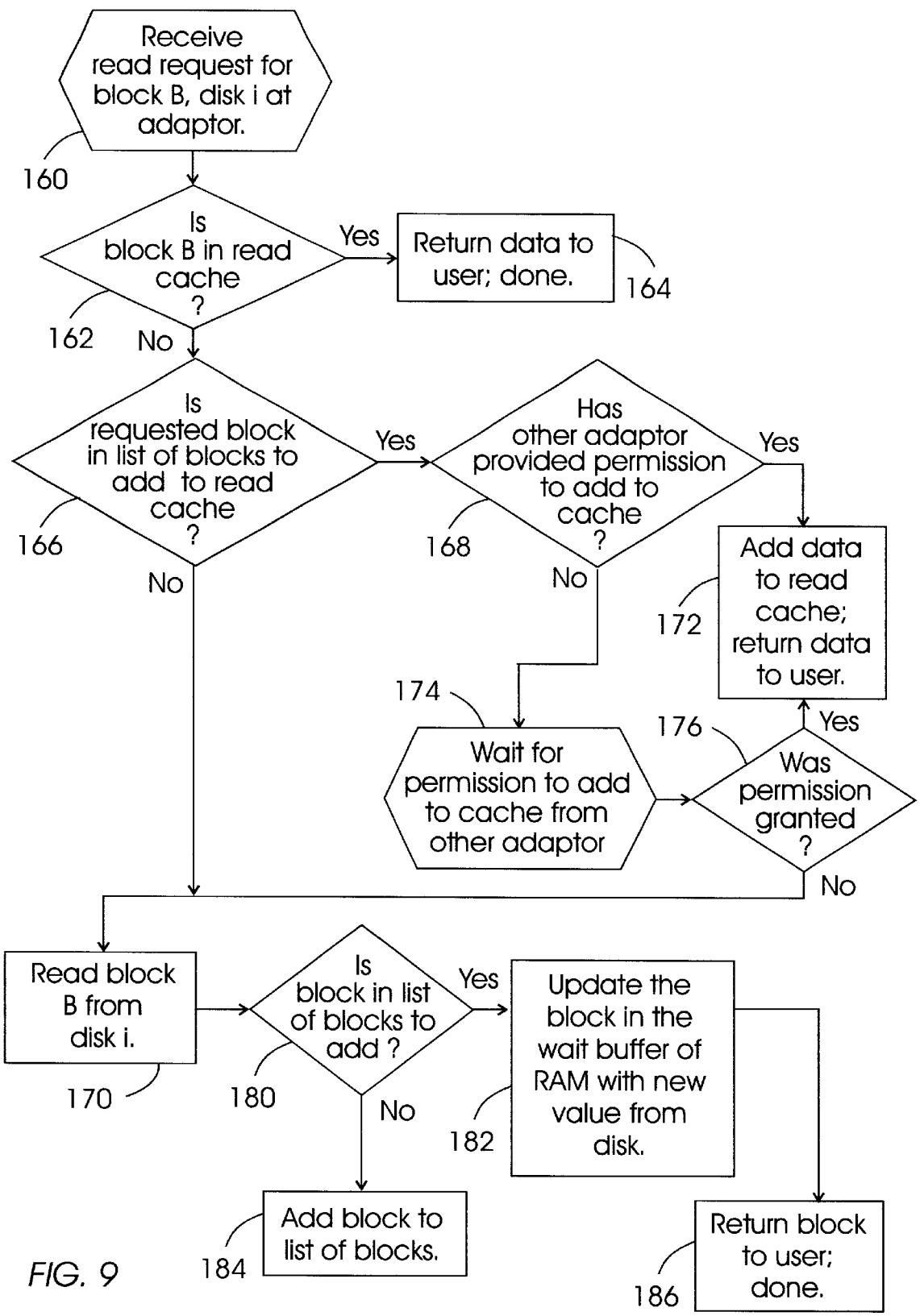
FIG. 9 illustrates a flowchart showing logic to handle a read request in accordance with preferred embodiments of the present invention.

FIG. 9 illustrates logic implemented in the adaptors 8a, b to handle a read request using the data structures 155, 156, 158. Control begins at block 160 which represents an adaptor, e.g., receiving adaptor 8a, receiving a read request for block B from disk i. Control transfers to block 162 which represents the receiving adaptor 8a determining whether the block is in its read cache 18a. If so, control transfers to block 164 to return the data from the read cache 18a to the user, and complete the program. Otherwise, if the data is not in the read cache 18a, control transfers to block 166 which represents the receiving adaptor 8a determining whether the requested block B is in the data structure 155a indicating blocks to add to the read cache 18a. If the data is in the data structure 155a, then a copy of the data is maintained in a wait buffer portion of the RAM 154. Data is held in this wait buffer area until the other adaptor grants permission to add the data to the read cache 18a. If so, control transfers to block 168; otherwise, control transfers to block 170. Block 168 represents the adaptor 8a determining whether the remote adaptor 8b has provided permission to add the block to the read cache 18a. Permission may be granted according to the permission exchange algorithm described with respect to FIGS. 11a, b.

If permission was granted, control transfers to block 172, which represents the receiving adaptor 8a adding the data in the wait buffer to the read cache 18a and returning the data just added to the read cache 18a to the user. If permission has not yet been granted, control transfers to block 174 which represents the adaptor 8a waiting for a response to the permission request from the remote adaptor 8b. Once the response is provided, control transfers to block 176, which represents the receiving adaptor 8a determining if permission was granted. If so, control transfers to block 172 to return the data to the user for those blocks where permission was granted. For those blocks where permission was denied or where the requested block was not in the data structure 155a, control transfers to block 170 which represents the receiving adaptor 8a reading the block B from disk i. Control then transfers to block 180 which represents the adaptor 8a determining whether the read block is listed in the data structure 155a indicating blocks to add to the read cache 18a. If so, control transfers to block 182; otherwise, control transfers to block 184.

Block 182 represents the receiving adaptor 8a adding the data read from disk i to the wait buffer in the RAM 154a. Control then transfers to block 186 which represents the adaptor 8a returning the block to the user. If the block is not in the data structure 155a indicating blocks to add, then at block 184, the adaptor 8a appends information on the blocks to the data structure 155a indicating blocks to add, and then proceeds to blocks 182 et seq. to return the data to the user.

In this way, a read request is processed in either two ways. If the data is in the read cache 18a, read the data from the cache 18a and send it to the user. If the data is in the disk i, then read from disk, send to the user, and then add to the list of blocks 155a to add to the cache 18a. However, the requested data cannot go into the read cache until the remote adaptor 8b provides permission pursuant to the permission exchange algorithm discussed in FIGS. 11a, b or other permission exchange algorithms known in the art. The permission exchange algorithm of FIGS. 11a, b insures that an adaptor with data in the wait buffer will not add that data to its read cache if the granting adaptor has recently updated to that data block on disk i.

Figure 10:
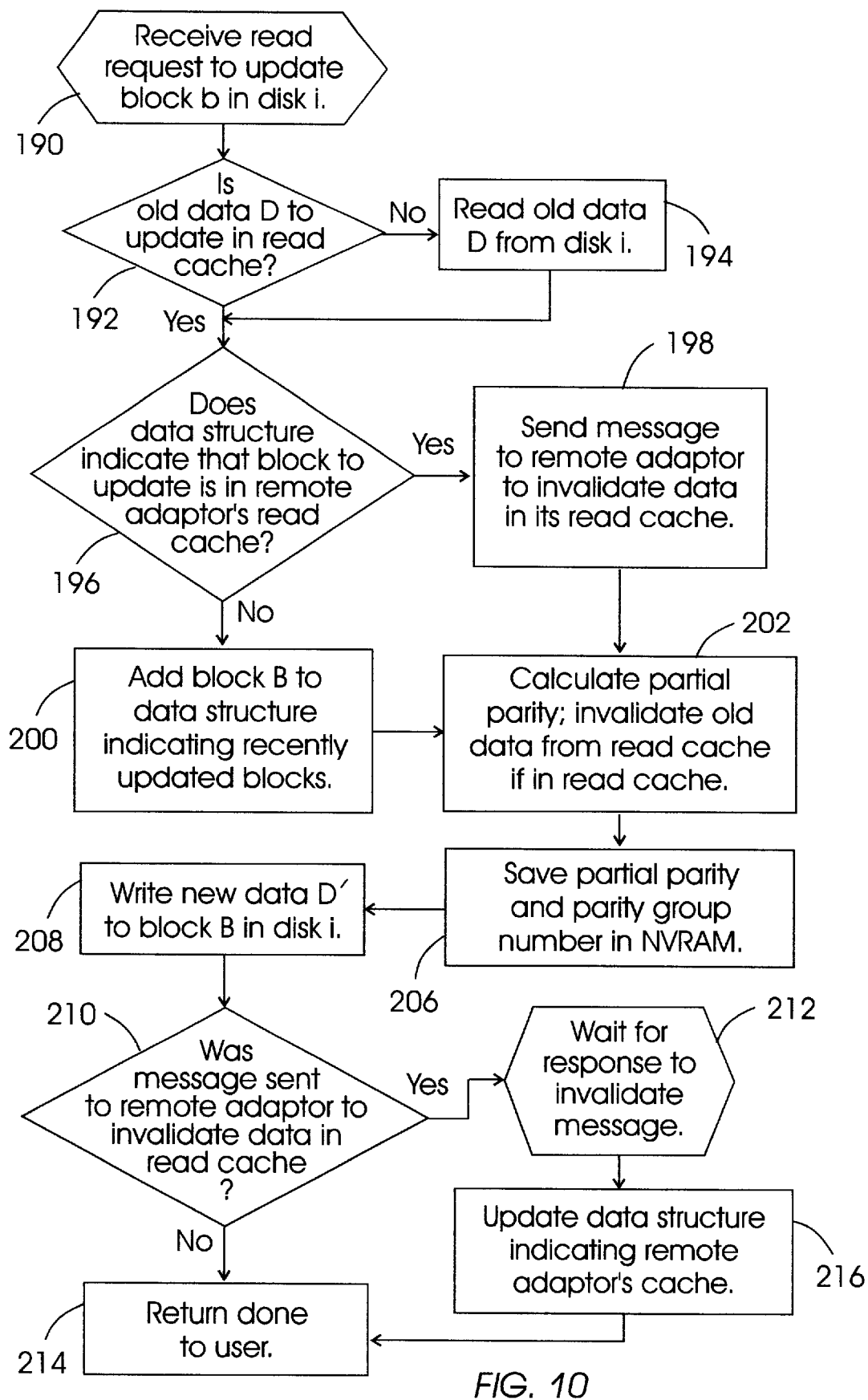
FIG. 10 illustrates a flowchart showing logic to update a data block using data structures in accordance with preferred embodiments of the present invention.

FIG. 10 illustrates logic implemented in the adaptors 8a, b to handle an update request of a block B in disk i, wherein disk j maintains parity data, using the data structures 155, 156, 158. Control begins at block 190 with an adaptor, e.g., updating adaptor 8a, receiving a request to update block B in disk i. Control transfers to block 192 which represents the updating adaptor 8a determining whether the old version D of the data to update is in the read cache 18a. If so, control transfers to block 194 to read the old data from disk i. If the data is in the read cache 18a at block 192 or if the data D is read from the disk i at block 194, then control transfers to block 196, which represents the updating adaptor 8a determining whether the data structure 158a indicating the blocks in the remote adaptor's 8b read cache 18b includes the block to update. If so, control transfers to block 198; otherwise, control transfers to block 200. Thus, with the data structure 158a, b, c, an adaptor 8a, b, c can determine the contents of the read cache 18a, b, c of another adaptor without messaging the adaptor.

If the remote adaptor 8b includes the block to update in its read cache 18b, then at block 198, the updating adaptor 8a sends a message to the remote adaptor 8b to invalidate the data block B to update from the remote read cache 18b. Otherwise, at block 200, the updating adaptor 8a adds block B to the data structure 158a indicating the block as recently updated. From block 198 or 200, control transfers to block 202 which represents the updating adaptor 8a calculating partial parity, e.g., D xor D', and invalidating the old data D from its read cache 18a if the old data D is in the read cache 18a. Control then transfers to block 206 which represents the updating adaptor 8a saving the partial parity and parity group number for the partial parity data in the NVRAM 16a. Control then transfers to block 208 which represents the updating adaptor 8a writing the new data D' to block B in disk i.

From block 208, control transfers to block 210 which represents the updating adaptor 8a determining whether a message was sent to the remote adaptor 8b at block 198. If so, control transfers to block 212; otherwise, control transfers to block 214. At block 212, the updating adaptor 8a waits for a response from the remote adaptor 8b to its message to invalidate the data sent at block 198. Upon receiving the response, control transfers to block 216 which represents the updating adaptor 8a updating the data structure 158 indicating the remote adaptor's 8b read cache 18b to indicate that the data block B was removed. From blocks 210 or 216, control transfers to block 214 to return DONE to the user.

FIGS. 11a and b are flowcharts illustrating logic implemented in adaptors 8a, b, respectively, when a requesting adaptor, e.g., adaptor 8a, requests permission from a remote adaptor 8b to add a block of data to its read cache 18a. The logic of FIG. 11a describes operations performed by the requesting adaptor 8a seeking permission to add data blocks to read cache 18a. The logic of FIG. 11b describes operations performed by the remote adaptor 8b to determine whether to grant permission to the requesting adaptor 8a. The purpose of the permission requesting algorithm is to insure that the requesting adaptor 8a does not add stale data to its read cache 18a. With respect to FIG. 11a, control begins at block 220 which represents the requesting adaptor 8a selecting a block to remove from the read cache 18a for each block the adaptor 8a intends to add to the read cache 18a. Control transfers to block 222 which represents the adaptor 8a removing the selected blocks from the read cache 18a. Control then transfers to block 224 which represents the requesting adaptor 8a sending a message to the other adaptor 8b with a list of blocks the requesting adaptor 8a intends to add to the read cache 18a and the list of blocks removed.

Control transfers to block 226 which represents the requesting adaptor 8a waiting for a response from the granting adaptor 8b. Control transfers to block 228 which represent the requesting adaptor 8a adding those blocks to which permission was granted to the read cache 18a. Those blocks where permission was denied are not added. Control transfers to block 230 which represents the adaptor 8a setting the data structure 155a indicating blocks to add to the read cache 18a to NULL.

With reference to FIG. 11b, control begins at block 232 which represents the granting adaptor 8b receiving the list of blocks the requesting adaptor 8a seeks to add to the read cache 18a. Control transfers to block 234 which represents the granting adaptor 8b processing the data structure 156b indicating the list of recently updated blocks to determine whether any blocks the requesting adaptor 8a intends to add were recently updated. At block 234, the granting adaptor 8b determines whether the requesting adaptor 8a intends to add data to its read cache 18a that is outdated in view of data the granting adaptor 8b recently updated. Control transfers to block 236 which represents the granting adaptor 8b sending a message to the requesting adaptor 8a denying permission to add those blocks included in the data structure 156b indicating blocks the granting adaptor 8b recently updated and permitting the requesting adaptor 8a to add those blocks not in the data structure 156b of recently updated blocks. Control transfers to block 240 which represents the granting adaptor 8b setting the data structure 156b indicating recently updated blocks to NULL.

Conclusion

This concludes the description of the preferred embodiments of the invention. The following describes some alternative embodiments for accomplishing the present invention.

In preferred embodiments, adaptors 8a, b, c interface the nodes 4a, b, c to allow sharing of storage resources. The adaptors 8a, b, c were described as having specific components, such as a processor 14a, b, c, NVRAM 16a, b, c, read cache 18a, b, c, write cache 20a, b, c, and NVS unit 22a, b, c. In alternative embodiments, some or all the components of the adaptors 8a, b, c may be located elsewhere in the node 4a, b, c or share resources with the computer 6a, b, c. In yet further embodiments, there may be a central computing resource or node that monitors or controls intercommunication between the nodes 4a, b, c.

The write cache 20a, b, c and read cache 18a, b, c may be memory locations within a single memory device or memory locations within a separate memory device, comprised of any suitable memory device known in the art, including volatile and non-volatile memory devices.

The logic of FIGS. 4–7 and 9–11 is for illustrative purposes. Additional or alternative steps may be performed in addition to those illustrated in the logic. Further, the order of the steps in the preferred logic may also vary.

Updated parity P' was calculated by taking the exclusive OR (XOR) of the old data D, new data D', and old parity P. However, those skilled in the art will appreciate that alternative methods known in the art for determining parity may be used in addition to the exclusive or operation (XOR) described herein.

The preferred embodiments may be implemented as a method, apparatus or article of manufacture using standard programming and/or engineering techniques to produce software, firmware, hardware, or any combination thereof. The term "article of manufacture" (or alternatively, "computer program product") as used herein is intended to encompass one or more computer programs and data files accessible from one or more computer-readable devices, carriers, or media, such as a magnetic storage media, "floppy disk," CD-ROM, a file server providing access to the programs via a network transmission line, holographic unit, etc. Of course, those skilled in the art will recognize many modifications may be made to this configuration without departing from the scope of the present invention.

In summary, preferred embodiments in accordance with the present invention provide a system for updating data at a data block. A first processing unit receives update data. The data block to update is located in a first storage device and a second storage device stores parity data for the data block. A parity group comprises a data block and corresponding parity data for the data block. The first processing unit obtains the data at the data block and calculates partial parity data from the data at the data block and the update data. The first processing unit stores the partial parity data in a storage area and writes the update data to the data block in the first storage device. The first processing unit further updates parity data for parity groups for which partial parity data is maintained by obtaining control of access to the parity group to update from a second processing unit if the first processing unit does not control access to the parity group. When the first processing unit controls access to the parity group, the first processing unit calculates new parity data from the partial parity data and the parity data in the second storage device, and writes the new parity data to the second storage device.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for updating data at a data block, comprising the steps of:
   receiving update data for a data block with a first processing unit, wherein the data block is located in a first storage device, wherein a second storage device stores parity data for the data block, and wherein a parity group comprises data block and corresponding parity data for the data block;
   obtaining data from the data block in the first storage device;
   calculating, with the first processing unit, partial parity data using the data from the data block and the update data;
   storing, with the first processing unit, the partial parity data in a storage area;
   writing, with the first processing unit, the update data to the data block in the first storage device; and
   updating parity data for parity groups for which partial parity data is maintained, wherein each parity group may be stored on at least the first or second storage device.

2. The method of claim 1, wherein the step of updating the parity comprises the steps of:
   obtaining control of access to the parity group to update from a second processing unit if the first processing unit does not control access to the parity group;

calculating, with the first processing unit, new parity data from the partial parity data and the parity data in the second storage device; and writing the new parity data to the second storage device.

3. The method of claim 1, wherein the partial parity data is calculated by taking the exclusive OR of the data at the data block in the first storage device and the update data.

4. The method of claim 1, further comprising the steps of:

determining whether the first and second storage devices are operational, wherein the step of updating the parity data occurs after determining that both the first and second storage devices are operational;

updating data and parity data, with the first processing unit, after determining that the first storage device failed, by performing the steps of:
 (i) calculating the data at the data block in the failed first storage device from the parity data in the second storage device;
 (ii) calculating new parity data from the calculated data, the update data, and the parity data in the second storage device; and
 (iii) writing the update data to a third storage device and the new parity data to the second storage device; and updating data and parity data, with the first processing unit, after determining that the second storage device failed, by performing the steps of:
 (i) calculating new parity data from data at the data block in the first storage device and the update data; and
 (ii) writing the update data to the data block in the first storage device and the new parity data to the third storage device.

5. The method of claim 1, wherein a second storage area storing partial parity data for parity groups is associated with the second processing unit, further comprising the step of the first processing unit transmitting a message to the second processing unit to update parity data for the parity groups for which partial parity data is maintained in the second storage area after the first processing unit determines a failure of at least one of the storage devices.

6. The method of claim 1, wherein the storage area in which the first processing unit stores partial parity data is a first storage area, wherein a second storage area stores partial parity data determined by the second processing unit, further comprising the step of determining a failure of a storage device and in response thereto, performing the steps of:
 (i) transmitting, with the first processing unit, a first message to the second processing unit indicating the parity groups for which partial parity data is maintained in the first storage area;
 (ii) transmitting, with the first processing unit, a second message to the second processing unit indicating the update of a parity group for which partial parity data is maintained in the first storage area after updating the parity data for the parity group; and
 (iii) transmitting, with the first processing unit, a third message to the second processing unit after receiving a data update and writing the data update to the first storage device and the new parity data calculated from the data update to the second storage device.

7. The method of claim 1, wherein the processing unit manages a first cache, and the second processing unit manages a second cache, further comprising the steps of:

determining whether the data at the data block is in the first cache, wherein the step of obtaining the data at the data block comprises obtaining the data from the first cache;

processing, with the first processing unit, a data structure to determine whether the second cache stores data for the data block; and transmitting, with the first processing unit, a message to the second processing unit to invalidate the data for the data block in the second cache after determining that the second cache stores data for the data block.

8. The method of claim 7, further comprising the steps of:

transmitting, with the second processing unit, a message indicating that the data for the data block in the second cache was invalidated; and updating, with the first processing unit, the data structure to indicate that the data for the data block is not in the second cache.

9. A system for updating data, comprising:

a first storage device storing data at a data block;

a second storage device storing parity data for the data block, wherein a parity group comprises a data block and corresponding parity data for the data block;

a first processing unit;

a second processing unit;

a storage area;

program logic executed by the first processing unit, comprising:
 (i) means for receiving update data for the data block;
 (ii) means for obtaining the data at the data block;
 (iii) means for calculating partial parity data from the data at the data block and the update data;
 (iv) means for storing the partial parity data in the storage area;
 (v) means for writing the update data to the data block in the first storage device; and
 (vi) means for updating parity data for the parity groups for which partial parity data is maintained in the storage area, wherein each parity group may be stored on at least the first or second storage device.

10. The system of claim 9, wherein the program logic executed by the first processing unit further comprises:

means for determining whether the first and second storage devices are operational, wherein the step of updating the parity data occurs after determining that both the first and second storage devices are operational;

means for updating data at a third storage device and parity data to the second storage device when the first storage device fails; and means for updating data at the first storage device and the parity data at the third storage device when the second storage device fails.

11. The system of claim 9, further comprising a second storage area storing partial parity data for parity groups associated with the second processing unit, wherein the program logic executed by the first processing unit further comprises means for transmitting a message to the second processing unit to update parity data for the parity groups for which partial parity data is maintained in the second storage area after the first processing unit determines a failure of at least one of the storage devices.

12. The system of claim 9, wherein the storage area in which the first processing unit stores partial parity data is a first storage area, further comprising:

a second storage area storing partial parity data determined by the second processing unit wherein the program logic executed by the first processing unit includes the following means executed by the first processing unit after detecting the failure of a storage device:

(i) means for transmitting a first message to the second processing unit indicating the parity groups for which partial parity data is maintained in the first storage area;

(ii) means for transmitting a second message to the second processing unit indicating the update of a parity group for which partial parity data is maintained in the first storage area after updating the parity data for the parity group; and (iii) means for transmitting a third message to the second processing unit after receiving a data update and writing the data update to the first storage device and the new parity data calculated from the data update to the second storage device.

13. The system of claim 9, further comprising:

a first cache managed by the first processing unit, wherein the program logic executed in the first processing obtains the data at the data block from the first cache after determining that the data at the data block is in the first cache;

a second cache managed by the second processing unit; and a data structure accessible to the first processing unit indicating whether the second cache stores data for the data block, wherein the first processing unit transmits a message to the second processing unit to invalidate the data for the data block in the second cache after determining from the data structure that the second cache stores data for the data block.

14. The system of claim 13, further comprising program logic executed by the second processing unit including means for transmitting a message indicating that the data for the data block in the second cache was invalidated and wherein the program logic executed by the first processing unit further includes means for updating the data structure to indicate that the data for the data block is not in the second cache.

15. An article of manufacture for use in programming a first processing unit to update data, the article of manufacture comprising at least one computer readable storage device including at least one computer program embedded therein that causes the first processing unit to perform the steps of:

receiving update data for a data block, wherein the data block is located in a first storage device, wherein a second storage device stores parity data for the data block, and wherein a parity group comprises a data block and corresponding parity data for the data block;

obtaining data from the data block in the first storage device;

calculating partial parity data from the data at the data block and the update data;

storing the partial parity data in a storage area;

writing the update data to the data block in the first storage device; and updating parity data for parity groups for which partial parity data is maintained, wherein each parity group may be stored on at least the first or second storage device.

16. The article of manufacture of claim 15, wherein the step of updating parity data comprises the steps of:

obtaining control of access to the parity group to update from a second processing unit if the first processing unit does not control access to the parity group;

calculating, with the first processing unit, new parity data from the partial parity data and the parity data in the second storage device; and writing the new parity data to the second storage device.

17. The article of manufacture of claim 15, wherein the partial parity data is calculated by taking the exclusive OR of the data at the data block in the first storage device and the update data.

18. The article of manufacture of claim 15, further comprising the steps of:

determining whether the first and second storage devices are operational, wherein the step of updating the parity data occurs after determining that both the first and second storage devices are operational;

updating data and parity data after determining that the first storage device failed, by performing the steps of:
   (i) calculating the data at the data block in the failed first storage device from the parity data in the second storage device;
   (ii) calculating new parity data from the calculated data, the update data, and the parity data in the second storage device;
   (iii) writing the update data to a third storage device and the new parity data to the second storage device; and updating data and parity data, with the first processing unit, after determining that the second storage device failed, by performing the steps of:
   (i) calculating new parity data from data at the data block in the first storage device and the update data; and
   (ii) writing the update data to the data block in the first storage device and the new parity data to the third storage device.

19. The article of manufacture of claim 15, wherein a second storage area including partial parity data for parity groups is associated with the second processing unit, further comprising the step of transmitting a message to the second processing unit to update parity data for the parity groups for which partial parity data is maintained in the second storage area after determining a failure of at least one of the storage devices.

20. The article of manufacture of claim 15, wherein the storage area in which the first processing unit stores partial parity data is a first storage area, wherein a second storage area stores partial parity data determined by the second processing unit, further comprising the step of determining a failure of a storage device and in response thereto, causing the first processing unit to perform the steps of:

(i) transmitting a first message to the second processing unit indicating the parity groups for which partial parity data is maintained in the first storage area;

(ii) transmitting a second message to the second processing unit indicating the update of a parity group for which partial parity data is maintained in the first storage area after updating the parity data for the parity group; and (iii) transmitting a third message to the second processing unit after receiving a data update and writing the data update to the first storage device and the new parity data calculated from the data update to the second storage device.

21. The article of manufacture of claim 15, wherein the first processing unit manages a first cache, and the second processing unit manages a second cache, further comprising the steps of:

determining whether the data at the data block is in the first cache, wherein the step of obtaining the data at the data block comprises obtaining the data from the first cache;

processing a data structure to determine whether the second cache stores data for the data block; and transmitting a message to the second processing unit to invalidate the data for the data block in the second cache after determining that the second cache stores data for the data block.

22. The article of manufacture of claim 21, wherein at least one computer readable storage device includes at least one computer program embedded therein that causes the second processing unit to perform the step of transmitting a message to the first processing unit indicating that the data for the data block in the second cache was invalidated and wherein the computer program further causes the first processing unit to perform the steps of updating the data structure to indicate that the data for the data block is not in the second cache.

23. A method for updating data in a data block utilizing a plurality of processing units, the method comprising:

receiving update data for a data block at a first processing unit, wherein the data block is located in a first storage device;

obtaining data from the data block in the first storage device;

calculating, using the first processing unit, partial parity data using the data from the data block and the update data;

storing the partial parity data and a corresponding parity group number in a first storage area of the first processing unit;

storing partial parity data and a corresponding parity group number for other data blocks in a second storage area of at least a second processor unit;

writing the update data to the data block in the first storage device using the first processing unit;

updating parity data for parity groups, the parity groups having data blocks and corresponding parity data, each parity data being stored on at least the first or a second storage device; and transmitting, between the first and second processor units, information stored in the storage areas of the of the first and second processor units upon determining a failure of a storage device occurs.

24. The method of claim 23, wherein the determining a failure of a storage device further comprises:

transmitting, with the first processing unit, a first message to the second processing unit for indicating the parity groups for which partial parity data is maintained in the first storage area;

transmitting, with the first processing unit, a second message to the second processing unit for indicating the update of a parity group for which partial parity data is maintained in the first storage area after updating the parity data for the parity group; and transmitting, with the first processing unit, a third message to the second processing unit after receiving a data update and writing the data update to the first storage device and the new parity data calculated from the data update to the second storage device.

25. The method of claim 23, wherein the updating parity data for parity groups further comprises:

transmitting a message from the first processing unit to the second processing unit to update parity data for the parity groups for which partial parity data is maintained in the second storage area after the first processing unit determines a failure of at least one of the storage devices.

26. The method of claim 23 further comprising:

managing a first cache by the first processing unit, and a second cache by the second processing unit, to provide validation of the data blocks prior to a read and a write operation being performed on the data blocks, the managing further comprising:

determining whether the data at the data block is valid in the first cache, wherein the step of obtaining the data at the data block comprises obtaining the data from the first cache;

processing, with the first processing unit, a data structure to determine whether the second cache stores data for the data block; and transmitting, with the first processing unit, a message to the second processing unit to invalidate the data for the data block in the second cache after determining that the second cache stores data for the data block.

27. The method of claim 26, further comprising:

transmitting, with the second processing unit, a message indicating that the data for the data block in the second cache was invalidated; and updating, with the first processing unit, the data structure to indicate that the data for the data block is not in the second cache.

* * * * *